US007360245B1

(12) United States Patent
Ramachandran et al.

(10) Patent No.: US 7,360,245 B1
(45) Date of Patent: Apr. 15, 2008

(54) METHOD AND SYSTEM FOR FILTERING SPOOFED PACKETS IN A NETWORK

(75) Inventors: Viyyokaran R. Ramachandran, Kerala (IN); Manoj Choudhary, Rajasthan (IN); Honnuduke S. Madhusudhana, Karnataka (IN)

(73) Assignee: Novell, Inc., Provo, UT (US)

( * ) Notice: Subject to any disclaimer, the term of this patent is extended or adjusted under 35 U.S.C. 154(b) by 1334 days.

(21) Appl. No.: 09/907,861

(22) Filed: Jul. 18, 2001

(51) Int. Cl.
*G06F 17/00* (2006.01)
*H04L 9/00* (2006.01)

(52) U.S. Cl. .......................... 726/13; 726/12; 726/22; 726/23; 726/24; 726/25; 713/154; 713/153

(58) Field of Classification Search .......... 713/201, 713/154, 153; 726/22, 13, 12, 23, 24, 25
See application file for complete search history.

(56) References Cited

U.S. PATENT DOCUMENTS

| | | | | |
|---|---|---|---|---|
| 5,675,741 | A * | 10/1997 | Aggarwal et al. | 709/242 |
| 6,003,084 | A * | 12/1999 | Green et al. | 709/227 |
| 6,073,178 | A * | 6/2000 | Wong et al. | 709/229 |
| 6,081,900 | A | 6/2000 | Subramaniam et al. | 713/201 |
| 6,115,376 | A * | 9/2000 | Sherer et al. | 370/389 |
| 6,658,003 | B1 * | 12/2003 | Sugai et al. | 370/392 |
| 6,714,970 | B1 * | 3/2004 | Fiveash et al. | 709/219 |
| 6,717,949 | B1 * | 4/2004 | Boden et al. | 370/401 |
| 6,738,814 | B1 * | 5/2004 | Cox et al. | 709/225 |
| 6,772,334 | B1 * | 8/2004 | Glawitsch | 713/153 |
| 2002/0023174 | A1 * | 2/2002 | Garrett et al. | 709/245 |
| 2002/0083331 | A1 * | 6/2002 | Krumel | 713/200 |
| 2002/0107961 | A1 * | 8/2002 | Kinoshita | 709/225 |
| 2002/0147925 | A1 * | 10/2002 | Lingafelt et al. | 713/201 |
| 2002/0150083 | A1 * | 10/2002 | Fangman et al. | 370/352 |
| 2003/0043853 | A1 * | 3/2003 | Doyle et al. | 370/489 |
| 2004/0181694 | A1 * | 9/2004 | Cox et al. | 713/201 |

OTHER PUBLICATIONS

P. Ferguson et al., Network Ingress Filtering: Defeating Denial of Service Attacks which employ IP Source Address Spoofing, Jan. 1998, RFC 2267, pp. 1-7.*
Jim Binkley "Authenticated Ad Hoc Routing at athe Link Layer for Mobile Systems" Feb. 2001 pp. 139-145.*
Marco de vivo et al. "Internet Security Attacks at the Basic Levels" Feb. 2001 pp. 4-15.*
Network Ingress Filtering: Defeating Denial of Service Attacks Which Employ IP Source Address Spoofing / Paul-Ferguson—Cisco Systems, Inc. and Daniel Senie—Amaranth Networks Inc. / May 20, 2000.

* cited by examiner

*Primary Examiner*—Nasser Moazzami
*Assistant Examiner*—Eleni A Shiferaw
(74) *Attorney, Agent, or Firm*—Haynes and Boone, LLP (57) ABSTRACT

A method and system is disclosed for preventing an address spoofing based attack from a private network. The private network has at least one host and at least one router connected therein for transporting at least one packet. An anti-spoofing filter is implemented in each interface of every router. When a packet is received on the interface, the filter determines whether the packet is address spoofed by comparing its source physical address derived from the received packet with expected physical address derived from interface IP address, a subnet mask of the interface, an ARP cache of the interface and a list of physical addresses of neighboring routers formed a priori If the packet is determined to be address spoofed, the received packet is discarded by the filter on the interface.

23 Claims, 6 Drawing Sheets

METHOD AND SYSTEM FOR FILTERING SPOOFED PACKETS IN A NETWORK

BACKGROUND OF THE INVENTION

The present invention relates generally to computer software, and more particularly, to a system and method for filtering Internet protocol (IP) address spoofed packets in a private network.

Generally, networks can be described as either public or private. A common example of a public network is the Internet. A common example of a private network is a corporate network. Many corporate networks may actually include one or more inter-connected networks which may be geographically dispersed but managed by a single authority (e.g., the corporation). Often, a private network utilizes a part of a public network. For example, a virtual private network (VPN) may use facilities that are owned by a public entity. Also, some corporate networks may actually be connected over the Internet through VPN.

Computer networks have become more and more sophisticated and complex in their management of data communication traffic. At the same time, concerns for the security of the computer networks, especially those of private networks, have escalated. One major concern is called "spoofing." Spoofing is an unauthorized act by a host generating and sending an IP packet containing a source IP address belonging to some other computer and thereby impersonating the other computer. Since there is often no source IP address authentication in a computer network's protocol specification and implementation, source IP address spoofing by various hosts is possible.

As it is well known in the industry, spoofing has been used to launch a variety of attacks on networks. Two specific types of attacks that have caused a great deal of concern for network administrators are Denial of Service (DOS) and Distributed Denial of Service (DDOS). In these attacks, the intent of the attacker is not to harm the victim by stealing, destroying, or manipulating confidential data on victim's computer. Instead, the attacker's intention is to illegitimately consume the victim's finite resources so that the victim is unable to service the legitimate service requests, which it could otherwise do or the victim is unable to access services provided by others. The resources targeted by the attacker include network bandwidth and system resources such as memory. Some well known attacks, often referred to as SYN, Smurf, and Land, use source IP address spoofing to form illegitimate request packets. These requests can be simultaneously sent by many intermediary systems, which are already compromised by the attacker in a DDOS attack. A further concern is that the attacker may use these intermediary systems as a launching pad for attacks to harm the victims.

If a network can stop these packets bearing a spoofed source IP address from leaving the network, then such a network cannot be used as a launching pad for DOS/DDOS attacks against a victim computer. Therefore, it is important that a private network protect itself from being used as a launching pad for these attacks either intentionally or unintentionally.

An earlier proposed method for preventing spoofing in a private network uses "Ingress Filtering" on IP packets. See Fergus, P and Sen, D., *Network Ingress Filtering: Defeating Denial of Service Attacks Which Employ IP Source Address Spoofing*, http://www.ietf.org/rfc/rfc2827.txt?number=2827. An ingress filter discards those IP packets whose source IP address do not reside in a predefined network IP address space. This filtering can be performed by internal routers as well as border routers connecting to the network environment external to the private network.

However, this ingress filtering method has certain disadvantages. For example, the ingress filter needs to be manually configured on appropriate interfaces of routers as well as the border routers in a private network because the routers cannot automatically decide the filtering details for their interfaces. Moreover, the ingress filter on a router interface needs an IP network prefix that covers all subnets behind the interface—such a prefix may not exist for most internal routers. If the prefix does not exist, it is not possible to configure the ingress filter for these internal routers, making it impossible to prevent IP spoofing from happening "deep" in the network.

Another problem is that "holes" (unassigned IP addresses) exist because all the available addresses in the subnet address space may not be fully used. Consequently, a packet containing a spoofed source IP address associated with a hole may not be detected by the ingress filter.

In addition, the ingress filter at the border router is not able to detect and prevent spoofing within a network because a host may generate source IP address spoofed packets with the IP address of another host in the same or different subnet, which also belongs to the same private network.

What is needed is an improved method for dealing with source IP address spoofing.

Furthermore, some applications in the private network computing environment, such as a distributed file service based on remote procedure call (RPC) service in an enterprise, rely on source IP addresses for host authentication for the purpose of resource access control. Although an IP address is uniquely associated with a host, it is not a reliable basis for authenticating that host because another host can impersonate the former by using its address for spoofing. Various applications and services that use IP address for authentication are therefore vulnerable to impersonation attacks.

Therefore, an improved method to deal with the problem of impersonation in applications in a private network that employs source IP address for authentication is also needed.

SUMMARY OF THE INVENTION

A method and system is disclosed for preventing an address spoofing based attack from a computer network having at least one host and at least one router. In one embodiment, an anti-spoofing filter is implemented in each interface of every router. First of all, information about the IP addresses and physical addresses of all hosts and routers in a computer network segment is stored on need basis in a memory space on the router's interface connecting to the computer network segment. When a packet is received on an interface, the filter determines whether the packet is address spoofed by comparing its source physical address with an expected physical address, which is derived from the packet's source IP address and the information stored on the interface. If the packet is determined to be address spoofed, the received packet is handled accordingly.

In one embodiment, the router has the ability to decide whether or not the received packet's source IP address lies within a subnet IP address space of a network segment directly connected to the receiving interface. If it is within the subnet IP address space, the physical address of the host that sent the packet, as specified in the IP packet's encapsulating frame, should match the physical address corresponding to source IP address in an address resolution protocol (ARP) table or cache on the router's receiving interface. If it does not match, the packet is spoofed. If the IP address is not in the subnet IP address space, then the packet should have been forwarded from a neighboring router on the same network segment. In other words, the physical address should be that of any connected router on a subnet directly connected to the receiving interface. If the IP address is not in the subnet IP address space, nor from a neighboring router on the same network segment, then the received packet contains a spoofed source IP address.

The present invention can thereby identify and prevent source spoofed packets from being further propagated by the network. Hence the network cannot be used intentionally or unintentionally as a launching pad (intermediary) of a DDOS attack.

The present invention also prevents impersonation in services using IP address based authentication in a private network.

DESCRIPTION OF THE PREFERRED EMBODIMENT

For purposes of illustrating the present invention, various technical terms are used throughout this disclosure. The following is a list of terms and their commonly understood definitions.

Host: In Internet Protocol specifications, the term "host" means any computer that has full two way access to other computers on the Internet. A host is therefore an originator and/or receptor of data link layer frames encapsulating IP packets. A host may have only a single network interface connecting to the network.

Router: A router is a device or, in some cases, software in a computer that determines the next network point to which a packet should be forwarded en route its destination. The router has at least two network interface cards connecting it to at least two networks. When receiving a packet, a router decides which way (interface) to send the received packet based on the packet's destination IP address and the router's routing table which is based on its current understanding of the state of networks.

Interface: The point at which a physical connection is made from a host or router to the rest of the network. Typically, the device used is called a network interface card. The network interface card is configured with its IP address in the connected network segment and the subnet mask (defined below) of the connected network segment.

Network Segment: A physical media connecting two or more computers together. Examples include Ethernet, token ring, ATM switch, radio net, satellite WAN link etc. Every network segment has a range of IP addresses allocated to various hosts connected to it, which are collectively referred to as subnet IP address space. A private network is made up by many network segments interconnected by routers.

Directly Connected Network: A network segment connected to a router or a host interface.

Frame: A data link layer packet encapsulating an IP packet. It also contains source and destination physical address as part of the data link layer header.

Physical Address (Hardware address): Media Access Control (MAC) address is uniquely associated with a network interface card connecting it to a network segment such as Ethernet, token ring or radio net etc. It identifies the local device address to the rest of the network segment and is defined by a 48-bit binary number.

IP Address: An IP address is typically a 32-bit binary number that identifies the sender or receiver of information that is sent in a packet. IP packet has IP header which contain both sender's (source) IP address and receiver's (destination) IP address.

ARP: Address Resolution Protocol. A protocol for translating between IP addresses and MAC-layer addresses in a network.

Network Number (subnet number): A designated identifier associated with a network segment. Every IP address belonging to a network segment can be split into two parts, the network number part (most significant bits) and the host number part (least significant bits), such that the network number part is common to all IP addresses in the network segment.

Net Mask (Subnet mask): A 32-bit binary mask having one's (1) in the network number part of the IP address and zeros in other bit positions. The network mask is the same for hosts and routers connected to a network segment and is configured on their respective network interface cards. By bit-wise logical "AND" operation of the subnet mask and the IP address configured on an interface, the network number of the network segment to which the interface is connected is obtained.

Subnet IP Address Space: A list of all possible IP addresses assignable to hosts or routers connected to a network segment. The network number part of IP addresses of all hosts within a subnet remains the same and is also referred to as the network number or subnet number.

Network Prefix: A common prefix of all IP addresses belonging to a private network. This is the basis for Ingress filtering at the border router of the private network. One example for the notation for specifying a network prefix is 205.69.200.0/24 which indicates that 24 MSB (Most Significant Bits) determine the network prefix.

Attacker: A program which runs on a host intentionally by its owner for the purpose of launching elementary DOS attacks or coordinating DDOS attacks using many compromised hosts or networks.

Master: A compromised system which is used by the attacker to install and control DDOS scripts on daemons.

Daemon: A compromised system which sends floods of packets to the victim by executing the DDOS scripts on them per master's commands. This flood of packets constitute the DDOS attack. In a DDOS attack, the attacker uses thousands of such daemons to improve the effectiveness of the attack.

Trojan Horse: A program which runs on a host without the owner of the host being aware of it. Or a program that runs with the awareness of the owner but does unintended things which owner is not aware of.

The present invention provides an effective solution for detecting and preventing source IP address spoofing by hosts in a network. In one embodiment, the present invention can detect and prevent spoofing attempts by hosts at any level in a private network, prevent exploitation of holes (unused IP addresses), and prevent spoofing using another host's IP address within the same private network. In addition, there is no need for manual configuration of filtering details on the routers of the private network.

The present invention may also utilize information locally available in the network, such as a routing table, neighboring router physical addresses, an ARP cache, and an interface IP address and subnet mask, in order to detect source IP address spoofing by a host. With all internal routers employing anti-spoofing filtering mechanisms, the source IP address spoofing problem is prevented in the entire private network.

Figure 1:
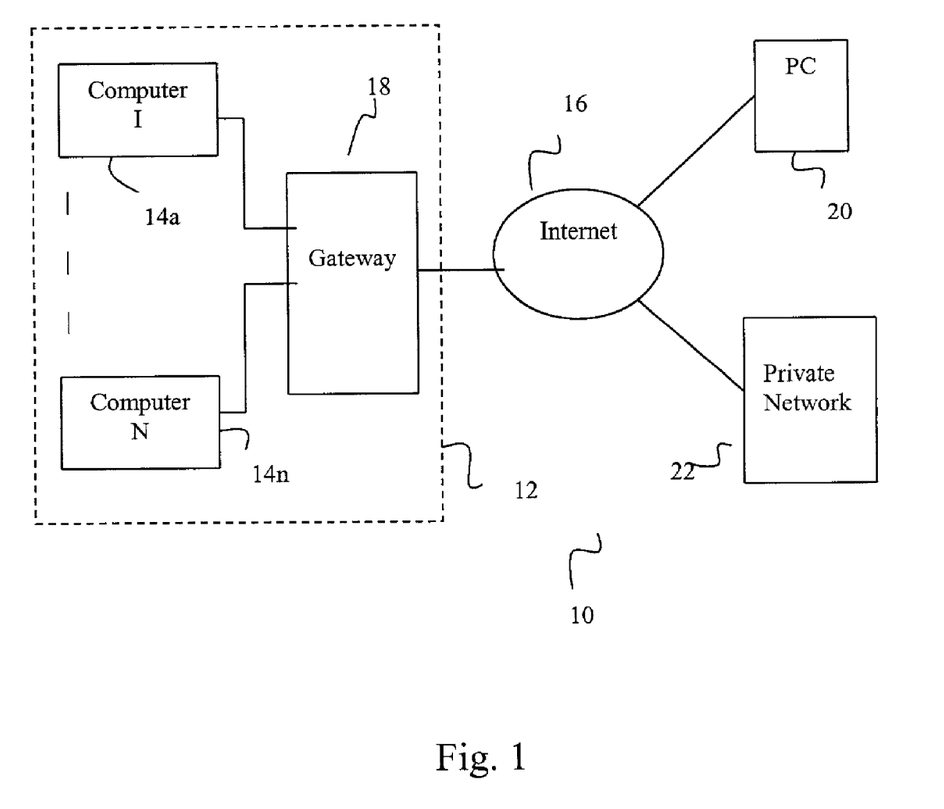
FIG. 1 illustrates a network schematic showing a networked computing environment.

Referring now to FIG. 1, a simplified network computing environment 10 may benefit from one or more embodiments of the present invention. The network 10 includes a private network 12 having internally networked computers 14a-14n. The private network 12 is also connected to the Internet 16 via a gateway (e.g. border router) 18. In the present example, any computing node or computer 14a-14n inside the private network 12 can communicate with each other, or a computer connectable through the Internet 16 such as a computer 20 or a computer of another private network 22. For purposes of this application, the computers may be referred to as hosts or routers.

Figure 2A:
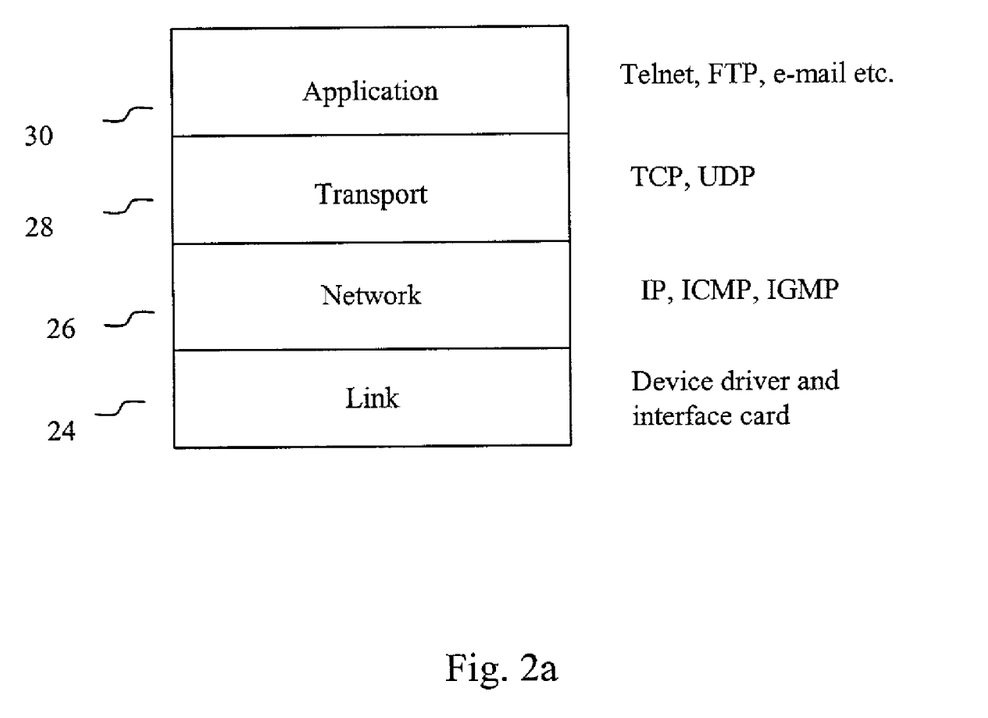
FIG. 2a illustrates the layers of TCP/IP protocol stack.

Referring to FIG. 2a, the computers in the network 10 may use TCP/IP protocol suite for communication. The TCP/IP protocol suite is arranged as a four-layer structure, with each layer having a unique responsibility for data communications. A data link layer 24 includes device drivers and the corresponding network interface cards in the computer. The next layer above the data link layer 24 is a network layer 26 which handles the forwarding or routing of packets around the network. A transport layer 28 provides the flow of data between two hosts for an application layer 30. The application layer 30 handles the details of the particular application such as telnet, remote login, ftp, and smtp.

The packet format conforming to the TCP/IP protocol for each layer is defined accordingly so that the lower layer encapsulates the packet at the higher layer. In other words, the lower layer packet format has layer-specific headers and a payload including next higher layer packets.

Figure 2B:
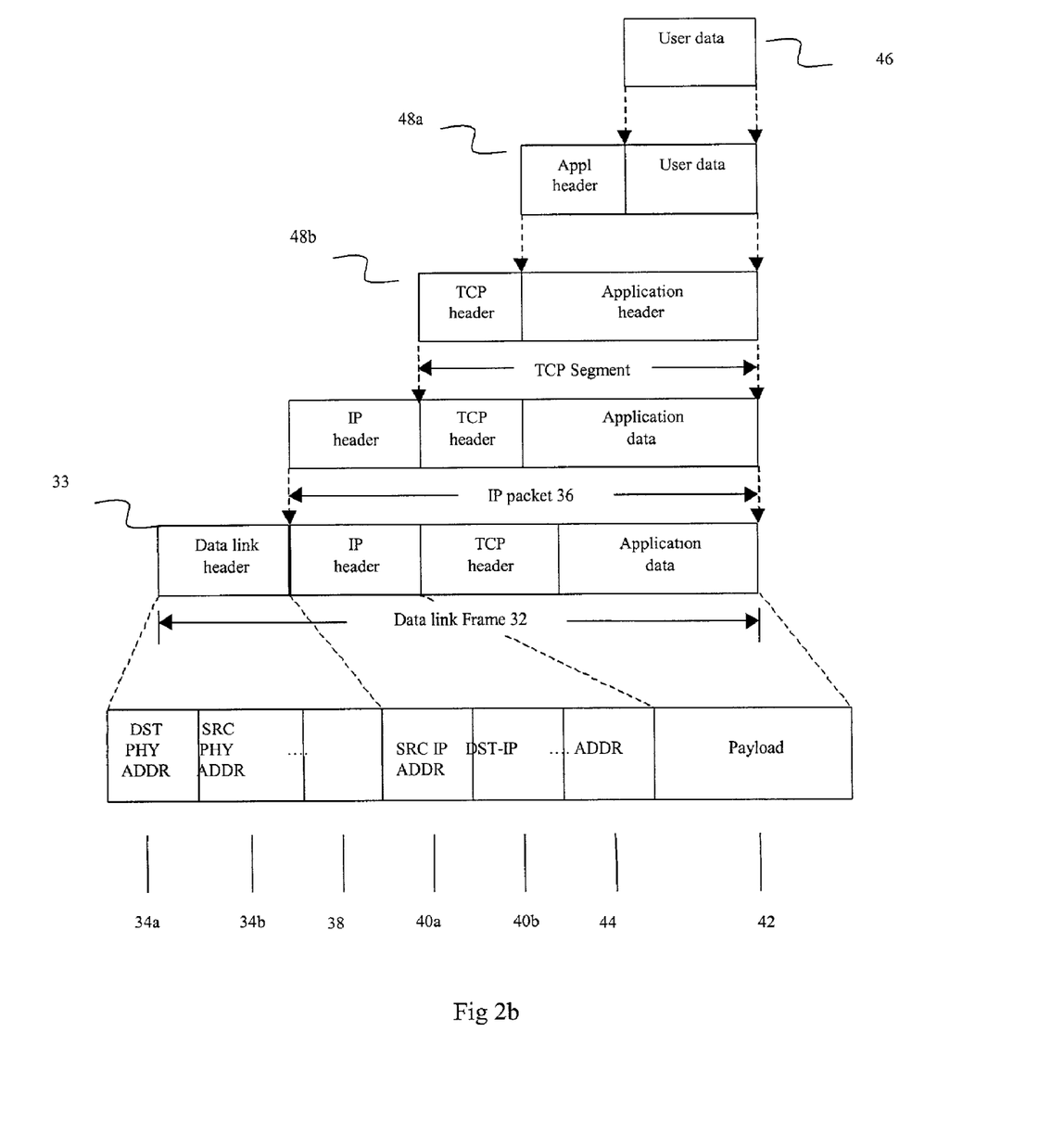
FIG. 2b illustrates a data link layer frame that encapsulates an IP packet.

Referring to FIG. 2b, a sample data link layer packet 32, also referred to as a data link layer frame (or simply "frame"), includes a data link layer header 33. The data link layer header 33 includes, among other things, destination and source physical addresses (sections 34a-b) of the next computers in communication and the payload which is an IP packet 36. The first section 34a in the data link layer header 33 indicates the destination physical address of the next hop destination host/computer and the second section 34b indicates the source physical address of the transmitting host/computer. Other sections 38 may also be included in the data link header 33.

Similarly, the IP packet 36 has header fields which include, among other things, the source and destination IP addresses (sections 40a-b) of the source and destination communicating computers, and a payload section 42 which primarily contains transport layer packet such as UDP or TCP. It is understood that, while the "DST-PHY-ADDR" represents the next hop destination, the "DST-IP-ADDR" represents the ultimate destination. Similarly, while the "SRC-IP-ADDR" represents the actual source computer, the "SRC-PHY-ADDR" represents current forwarding router. The IP header may also include other sections of information such as section 44. The payload section 42 contains transport layer packet which is not the subject of the present application. Therefore, in the present embodiment, user data 46 will be embedded within a data link frame by having various headers such as application header 48a, transport header 48b, IP header 48c, and data link header 33. With the information contained in these sections of the data packet 32, the user data can be routed from network to network, and from computer to computer with ease.

Figure 3:
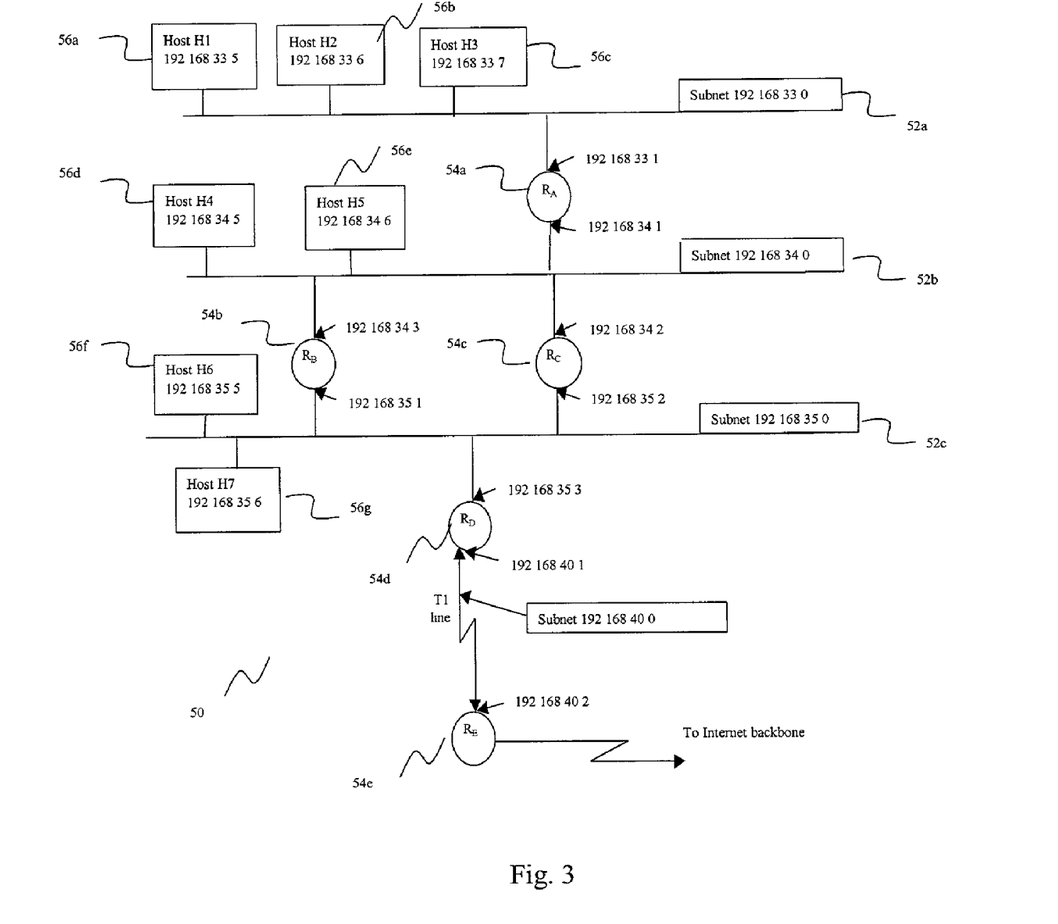
FIG. 3 illustrates network components in a private network for implementing one example of the present invention.

Referring now to FIG. 3, the private network 22 contains three network segments, identified as sub-networks (or simply, subnets) with network numbers (subnet numbers) 192.168.33.0 (52a), 192.168.34.0 (52b) and 192.168.35.0 (52c). The subnets are interconnected by routers $R_A$ (54a), $R_B$ (54b), $R_C$ (54c) and $R_D$ (54d). The private network 22 is connected to outside networks such as the Internet 16 (FIG. 1) through router $R_D$ which connects through a point-to-point link to an ISP router $R_E$ (54e) which further connects to the Internet backbone.

The private network 22 also includes many host computers 56a-56g. For the sake of example, hosts computers 56a-56g have identifiers H1-H7, respectively. In addition, hosts 56a-c are connected to subnet 52a, hosts 56d-e are connected to subnet 52b, and hosts 56f-g are connected to subnet 52c of the private network 22.

In the example illustrated in FIG. 3, each node of the network 22 includes a network IP address (shown in the text box) configured on the connecting interface. For example, the computer host 56a (host H1) has an IP address of 192.168.33.5. Also, the various interfaces of the routers 54a-54d have corresponding IP addresses. It is understood that each router may have more than one interface, and the use of corresponding interfaces depends on which connected subnet is sending the packets. For instance, when router $R_A$ receives an IP packet through the interface 192.168.33.1, it should have been generated by a host in the 192.168.33.0 subnet (or forwarded by another router connected to this subnet).

The present invention provides an anti-spoofing filter mechanisms, which can be used on various routers of the private network 22. However, before the filter mechanism is shown in detail, a specific example will be discussed to better describe how the mechanism operates. This example will show the detection of source IP address spoofing in the subnet 192.168.33.0 by the router $R_A$.

The present example starts with the computer host H1 (56a) sending a packet with a spoofed source IP address to a host in another subnet (or an outside network). The host H1 sends the packet to $R_A$ after consulting it's routing table. There are three possible cases for spoofing an IP address:

1. Host H1 uses an IP address for spoofing which does not lie in the same subnet 192.168.33.0.
2. Host H1 uses an IP address for spoofing which lies in the same subnet 192.168.33.0 and it is also used by another host, such as host H2.
3. Host H1 uses an IP address for spoofing which lies in the same subnet 192.168.33.0, but the IP address is not found to be used by another operative host in the subnet.

In accordance with the present invention, router $R_A$ will be able to detect the spoofing in each case. When router $R_A$ receives an IP packet through the interface 192.168.33.1, it indicates that the packet should have been generated by a host in the 192.168.33.0 subnet or forwarded by another router connected to this subnet. In this particular case, since there are no other routers connected to the 192.168.33.0 subnet, the packet must be from a host within the subnet. Hence, the source IP address in the IP header of the received packet should bear the common portion "192.168.33" while leaving the rest portion of the IP address to identify specific host in the subnet. In case 1, since the received packet contains a source IP address not in the subnet address space, and since no other routers are connected to this subnet, it is determined that the packet contains a spoofed source IP address.

In case 2, the source IP address of the received packet is in the subnet address space, and the ARP cache on the router interface 192.168.33.1 of router $R_A$ indicates that the source IP address belongs to host H2. In the present example, the ARP cache contains an <IP address, physical address> pair mapping IP address of H2 to the physical address of H2, but the physical address found in the encapsulating frame is that of H1. This mismatch between the physical address obtained from the ARP cache corresponding to the source IP address of the IP packet and the source physical address of the encapsulating data link frame indicates that the source IP address is spoofed in the received packet.

In case 3, the source IP address of the received packet lies in the receiving interface's (192.168.33.1) subnet address space, but after checking with the ARP cache on that interface, it is concluded that the source IP address does not belong to any host in the subnet. In the present example, there is no existing <IP address, physical address> pair stored in the ARP cache for mapping the given source IP address to some physical address. This also indicates that the source IP address is spoofed.

It is understood that the ARP cache on the router interface contains the physical address mapping entry corresponding to the source IP address of the received packet. If it does not, the router should broadcast an ARP request to the entire subnet on the receiving interface to get the required physical address mapping entry. Therefore, the above example assumes that the ARP cache contains all needed <IP address, physical address> pairs.

The anti-spoofing mechanisms described above are similarly applied in the subnet 192.168.34.0, especially by the connected routers $R_A$, $R_B$ and $R_C$. Additional steps may be taken due to the layout of these subnets. For example, in case 1, an additional check is made in which each router has to examine whether the received packet is forwarded by another router in the same subnet. More specifically, the router $R_A$ should check whether the received frame contains the source physical address of $R_B$ or $R_C$. If so, the packet has been forwarded by a neighboring router and hence it is declared to be not spoofed. In order to do so, for each interface of each router, a list of physical addresses of other routers in the same subnet is maintained.

In the subnet 192.168.35.0, the router $R_D$ may only implement the anti-spoofing mechanisms on interface 192.168.35.3, but not on interface 192.168.40.1, as the latter connects to $R_E$ through a point-to-point link (i.e., it is not shared by other hosts). In general, the anti-spoofing mechanisms may be only implemented on router interfaces connecting to shared network segments employing ARP for physical address resolution. There may not be any need to do the same on the interfaces which connects with no other hosts.

In the special case, where a router is connected to a single host over a point-to-point link such as a dial up line, the router may allow only packets containing the source IP address assigned to the single host to pass, since that is the only host connected to the subnet represented by the point-to-point link.

Figure 4:
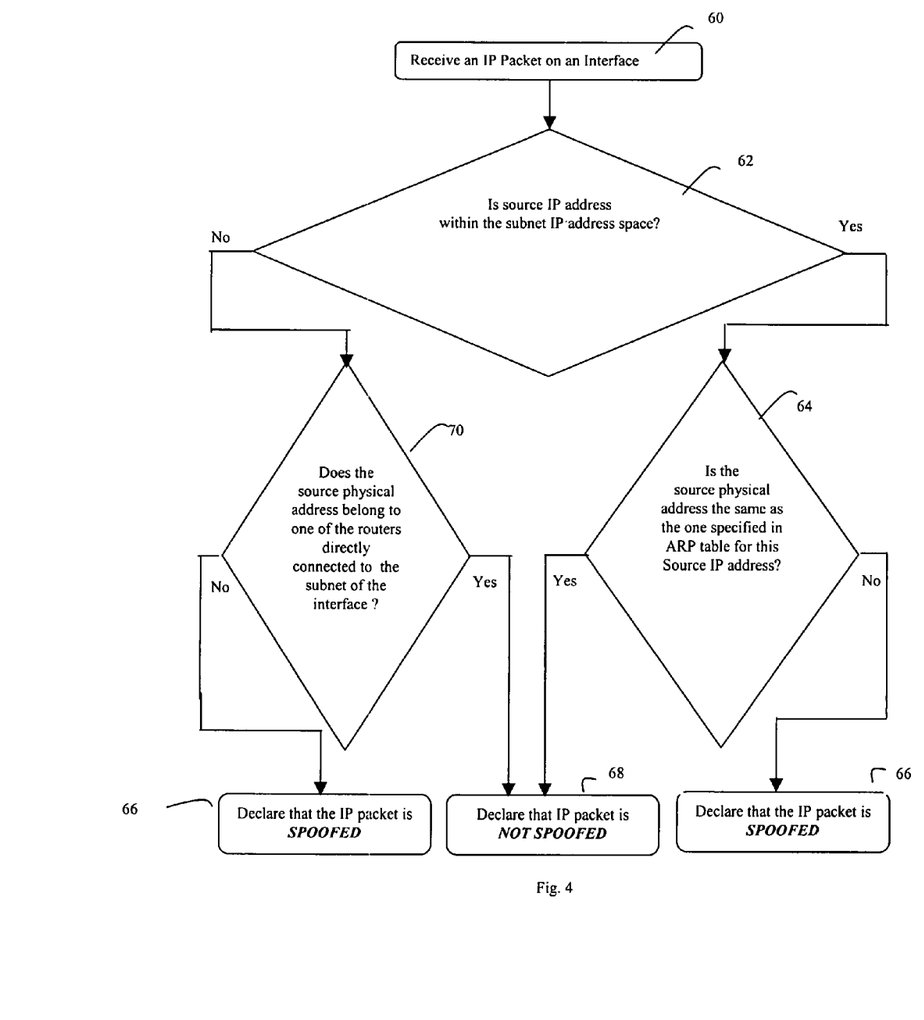
FIG. 4 illustrates a flow diagram for filtering out source IP spoofed packets according to one example of the present invention.

Referring to FIG. 4, a filter mechanism 58 can be implemented in one or more of the routers of the private network 22. Execution begins at step 60 when a router receives an IP packet through an interface. In step 62, the router examines whether the source IP address in the received IP packet header lies in the subnet IP address space as configured on the interface. The examination at step 62 may further involve the following steps:
1) extracting the network number from the source IP address by forming the bit-wise "AND" operation of the sub-net mask of the receiving interface and the source IP address of the received packet.
2) extracting the network number from the interface IP address by forming the bit-wise "AND" operation of the sub-net mask and the IP address of the receiving interface.
3) checking whether the result from 1) equals that of 2). If they are equal, the IP address of the incoming packet lies in the subnet IP address space of the receiving interface. Otherwise, it lies outside the subnet IP address space of the receiving interface.

If the source IP address of the packet is determined to be within the subnet IP address space in step 62, execution proceeds to step 64, where a determination is made as to whether the source physical address in the corresponding encapsulating frame is the same as the one specified for this particular source IP address found in the ARP cache of the interface. If the two physical addresses do not match, execution proceeds to step 66 and the IP packet is declared to be spoofed. If they do match, execution proceeds to step 68 and the IP packet is not spoofed.

If at step 62 the source IP address in the IP header is determined to be outside of the subnet IP address space as configured on the interface, a further examination is executed in step 70 to see whether the source physical address belongs to one of the other routers directly connected to the current subnet that the interface belongs to. If the source physical address can not be found to be that of any one connected router, the packet is deemed to be spoofed (step 66). Otherwise, the packet is declared to be not spoofed (step 68). It is understood that if there is only one router involved, then step 70 can be skipped.

In some embodiments, each router in the network should immediately discard the packet upon determining that it is spoofed, and thus prohibit the spoofed packet from being routed further in the network environment. Because each router controls whether the packet is allowed to get out from a network segment or a subnet, the source IP address spoofed packets are thus effectively prevented from being routed out and thus further contaminating other segments of the network. Consequently, the network can not be used as a launch pad for DOS/DDOS attacks based on IP address spoofing.

In the above described embodiments, it is understood that a router should know the physical addresses of all other routers directly reachable through a given interface (also referred as neighboring routers). It is also understood that each router in the private network should be able to maintain such a physical address list of neighboring routers for each of its interfaces. In some embodiments, the present invention also specifies the mechanisms and methods forming and maintaining such a list as follows. For a router interface, the IP addresses of some neighboring routers are available in the routing table held by the router. The corresponding physical addresses are obtained by broadcasting ARP requests for these IP addresses in order to receive replies thereof which in turn update the ARP cache on the interface with the corresponding physical addresses. The routing protocols decide in favor of one route (through a router) instead of another route based on some predetermined parameters (such as distance). Therefore, a router may not always have a complete list of all neighboring routers in its routing table, and hence the neighboring router physical address list for the interface may be incomplete. For example, in the network of FIG. 3, the routing table computation done by using routing protocol such as the Routing Information Protocol (RIP) at router $R_A$ will compute a route to subnet 192.168.35.0 either through router $R_B$ or router $R_C$, which means that either $R_B$ or $R_C$ but not both will be present in the routing table of $R_A$.

If the list of physical addresses of neighboring routers at an interface is not complete, the filter at that particular interface may declare an unspoofed packet from a genuine router as being spoofed just because the router routing this packet happens to be excluded from the list. In order to have a complete list, a second list of neighboring routers is obtained for each interface from all routing protocol advertisements received through that interface. The list is formed for each interface by extracting the source physical address from all routing advertisement messages received through that interface which always contain the physical addresses of the respective neighboring routers. This second list is updated periodically based on the frequency of routing protocol advertisements employed in the private network to reflect the changes in network topology as well as to keep the second routing list complete. The second list, when merged with the first list computed from the routing table, gives a complete set of physical addresses of all neighboring routers for each interface of a given router.

It is further understood that the form of the routing advertisement varies depending on which dynamic routing protocols is employed in the private network. In one example, Interior Gateway Protocols are generally used in private networks, which contain RIP and Open Shortest Path First (OSPF) protocol. The RIP response messages are routing advertisements which carry either full or partial routing table of the sending router. The source physical address of this message is that of the sending router. In the case of OSPF, OSPF HELLO messages are the routing advertisements intended to find out the neighboring routers. The physical address list of neighboring routers for a router interface is thus formed from the received OSPF HELLO messages and/or RIP response messages through that interface.

For spoof-proof security of the network, the "per-interface" physical address list of neighboring routers maintained by a router should be as authentic as possible. That is, the list should contain the addresses of genuine routers, but nothing else. It is possible that a host in a subnet may send false or "faked" RIP response messages in order to mislead the neighboring routers to recognize it as a router. If the other routers are "fooled" by such a scheme, whatever the source IP address of the spoofed packet sent by the faked router is, it will now be treated as a forwarded packet, and hence, the spoofing will not be detected. This situation is possible because routing messages are generally not authenticated, and it is not clear whether the message originates from a genuine router or from a host. In order to verify that the per-interface physical address list of neighboring routers is authentic, each entry in the list should be independently tested to assure that it is a router and not a host.

In one example, several tests can be used based on network behaviors which distinguish routers from hosts. A router should test periodically each neighboring router on all interfaces using these tests and remove the physical address of routers that fail the tests from the per-interface neighboring router list. For the purposes of illustration and for the sake of convenience, a router is referred to as the testing router and its neighboring routers being tested as the tested routers.

In one particular test, the testing router may send a special IP packet to a tested router. This packet will have its source and destination IP addresses set to the IP address of the testing router's interface, and the destination physical address in the encapsulating frame is set to that of the tested router. If this packet comes back to the testing router's interface, the tested router is a genuine router. A host masquerading as a router will not pass this test because the routing functionality is not enabled on it.

In another particular test, the tested router is forced to generate an ICMP redirect message. The testing router sends a special IP packet using the IP address of one of the interfaces ("sending interface") as the source IP address. The destination IP address of this special IP packet is the IP address of any interface of the router other than the "sending interface". In the special case, where a router has exactly two interfaces and the interface other than "sending interface" does not have an IP address assigned thereto, then some IP address belonging to the network segment reachable through that interface will be used. If the tested router is not directly connected to the destination network to which the test packet is addressed, it will send an ICMP host redirect message to the testing router to indicate that the testing router itself or some other router on that subnet has a shorter path to the destination. It may also forward the packet to an appropriate interface according to its routing table. In the case where the tested router is directly connected to the receiving interface of the testing router, it will forward the packet to the testing router through that interface and will not generate ICMP redirect message. In any case, the testing router either receives the test packet back through any of its interfaces or ICMP redirect message from the tested router through the sending interface or both. If the testing router does not receive either of the above two responses, then the tested router is not a genuine router.

For example, in FIG. 3, the testing router is $R_A$ and the tested router is $R_B$. Router $R_A$ sends a packet to $R_B$ with the destination address 192.168.33.1 (i.e. the IP address of another interface of $R_A$) and the source address (sending interface address) as 192.168.34.1. Since the destination address lies in the subnet 192.168.33.0 and the routing table at $R_B$ shows that a route to the subnet 192.168.33.0 is through router $R_A$, router $R_B$ generates and sends an ICMP redirect message suggesting $R_A$ to the sending host (which is $R_A$ itself in this particular test). If $R_B$ is not a genuine router, it would not have generated ICMP redirect message. On receiving the redirect message in response to such a test packet, $R_A$ can conclude that $R_B$ is a genuine router. On the other hand, if the test packet itself comes back to $R_A$, then $R_A$ can also conclude that $R_B$ is a genuine router because $R_B$ have forwarded it. If neither ICMP redirect message nor the test packet comes back to $R_A$, then $R_A$ concludes that $R_B$ is not genuine router. In the above example, $R_A$ could have used the destination IP address in the test packet to be that of H1, H2 or H3 etc. instead of 192.168.33.1 had that interface is not assigned with an IP address.

In yet another example of the test, the examination may be done by making the tested router generate an ICMP Time Exceeded message based on a time parameter. An ICMP Time Exceeded message is always generated by a router when it receives an IP packet with the value of a time parameter called Time To Live (TTL) being less than 2 (either 0 or 1). In this particular test, the testing router sends a special IP packet in which the source IP address is its own interface IP address and destination IP address that can be reachable through the tested router based on the routing table entries in the testing router. In addition, the TTL parameter in the IP packet header is set to one (1). In response, the tested router will generate and send an ICMP Time Exceeded message to the testing router upon reducing the TTL value to 0 due to the forwarding process. If this expected message is not received, then the tested router is not a genuine router.

It is possible that a tested router may have to pass at least two out of three different tests mentioned above, thereby confirming its routing functionality to the testing router. A network designer or administrator can decide how many tests the tested router has to go through. If a tested router fails the predetermined tests, then the tested router's physical address will be deleted from the physical address list by the testing router for its relevant interface. This means that any IP packet received from that host, which falsely advertises itself as a router, will be treated as a spoofing source. All these tests are to be done periodically by a router on each of its interfaces to maintain the authenticity of the physical address list of neighboring routers for that interface of the router authentic.

Figure 5:
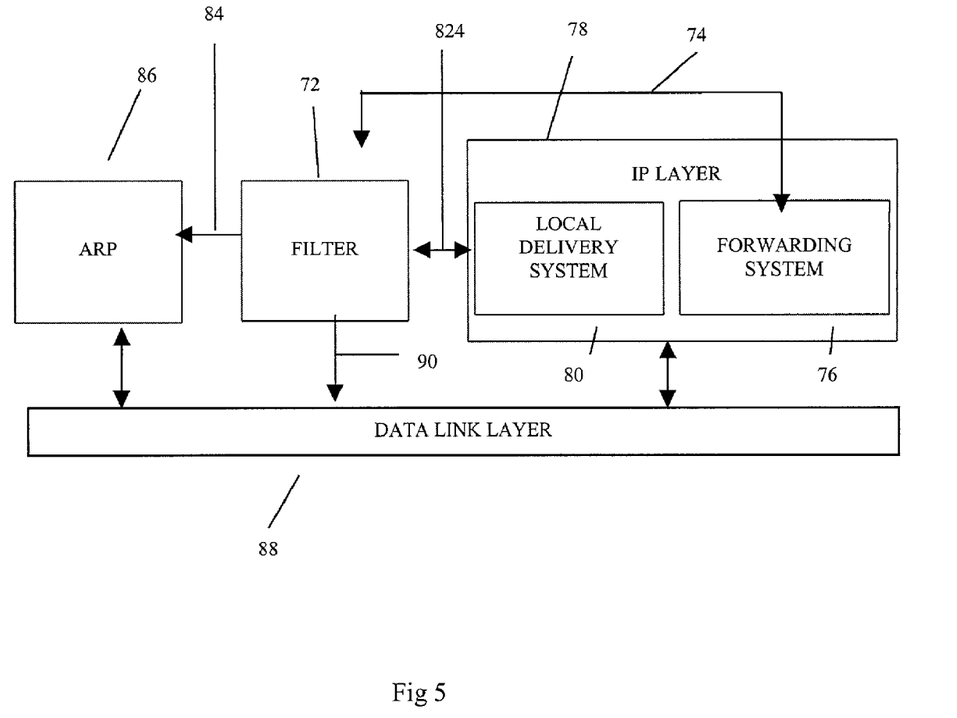
FIG. 5 illustrates a typical implementation of the proposed filter.

Referring to FIG. 5, a filter 72 embodying the present invention includes a hook 74 to the IP forwarding subsystem 76 in the IP layer 78 of a router so that the filter 72 can forward or discard packets after source IP address validation. The filter 72 needs to read routing advertisements received by the router without modifying or dropping thereof. The filter 72 also need to receive and process responses to the router's test messages which were generated and sent by the filter. Since all these test messages are destined to the router, these messages are processed by existing local delivery subsystem 80 of the router. The filter needs another hook 82 to the local delivery subsystem 80 for passively reading the routing messages as well as reading and dropping the responses of the test messages after processing them. The filter should also be able to use ARP-mapping-interface 84 to request ARP module 86 for source IP address to physical address mapping of the received packets. Finally, the filter should be able to generate and send special IP packets for router tests and therefore it should use a sending interface 90 of the data link layer 88 to send test packets.

The performance of the proposed filter in terms of computational speed can be analyzed as described below. In the normal mode of operation the filter has already performed the necessary router tests and formed the per-interface neighboring router physical address list. Therefore, the filtering process involves validating the source IP address of packet using ARP cache and interface configuration information, which involves only 3 or 4 address comparisons. Such an overhead for doing the comparison is not more than that of any other packet filters employed in routers that are widely known in the industry. When the router is forming or updating the neighboring router physical address list, there is an overhead for doing the router tests, but it spreads over time as the tests are done periodically and on an as-needed basis.

The present invention has technical advantages for detecting source IP address spoofed packets originating from hosts and preventing such packets from leaving a private network. Various well-known attacks that make use of IP address spoofing include Smurf, SYN, LAND, TFN and Stacheldraht etc. In a Smurf attack, which is a simple DOS attack method, the attacker sends an ICMP echo request broadcast message to an intermediate network with the source IP address spoofed to be that of a victim's IP address. All the hosts in the intermediate network send an echo reply to the victim, thereby congesting the victim's network. The present invention stops an attacker from sending echo request broadcast packet with spoofed IP address and hence prevents the intended Smurf attack at the source (attacker's network) itself. In this way, any host running programs generating Smurf attack packets (ICMP echo request broadcast packets with spoofed IP address) intentionally or unintentionally is prevented from launching such an attack.

In a TCP SYN attack, which is another simple DOS attack technique, the attacker sends a large number of SYN requests (TCP Open Connection requests) with spoofed source IP addresses which are not assigned to any hosts. These SYN packets initiate half-open sessions at the victim's host holding up it's finite resources like memory. Again, the present invention prevents an attacker from sending such spoofed SYN packets and thereby launching an SYN attack intentionally or unintentionally.

In the LAND attack, which is also a simple DOS attack technique, the attacker sends TCP SYN packets to a victim with source host/port set as the same as the destination host/port of the victim. This may ultimately crash the victim's machine as it tries to open connections to itself. Once again, the present invention does not allow the attacker to send such spoofed TCP SYN packets outside the attacker's network, thus preventing an intentional or unintentional LAND attack right at the source itself.

DDOS attacks such as TFN, TFN2K and Stacheldraht are programs (tools) consisting of attacker, master and daemon programs, each running on different hosts belonging to several private networks. Usually there will be a single attacker who coordinates several master programs running on compromised hosts in one or more private networks. Each master in turn controls several daemons each running on hosts belonging to different private networks. The daemons employ simple DOS attack techniques such as SYN, SMURF, LAND etc. which employ source IP address spoofing to attack a pre-determined victim host. While the attacker program is run intentionally, the master and daemons are installed on compromised hosts and executed without the knowledge of the respective owners. In this respect, master and daemon programs are Trojan Horse programs as they are executed without the owner of the host being aware of them. If the private network hosts are compromised and used as daemons, then that respective private network is being used as a launching pad of the DDOS attack without the knowledge of even the administrator of the private network. As the present invention prevents any attempts by hosts to send spoofed packets, the spoofed packets generated by daemons are detected and dropped by the filter at the nearest intermediate router in a private network, thereby preventing a private network being used as a launching pad by a DDOS attack. Any kind of DDOS tools, present or future, that employs spoofing in a private network for elementary DOS attack are thus prevented.

Some applications/services in the private network computing environment (such as Remote Procedure Call (RPC) services, X Window system, the family of R services such as rsh, rlogin, rcp etc.) rely on the source IP address for host authentication purposes. An attacker host can impersonate another host, which is authorized to access some predetermined services, by sending spoofed requests with the latter's IP address. This is called impersonation in source IP address based authentication. In a private network, the present invention prevents one host impersonating another authorized host by blocking spoofed packets from an attacker host at the nearest internal router.

In summary, the principle behind the present invention is that a router can decide whether or not the received IP packet's source IP address lies within the subnet IP address space of the directly connected network of the receiving interface. If it is within the subnet IP address space, the host who sends the packet should have its physical address as specified in the IF packet's encapsulating frame matching the one specified for the source IP address in the ARP table on the router's receiving interface. If the IP address is not in the subnet IP address space, then the packet should have been forwarded from a neighboring router on the same network segment. In this case, the physical address should be that of any connected router on the directly connected subnet of the receiving interface. In situations other than the above, the received packet contains a spoofed source IP address. The present invention thus prevents source spoofed packet (with a source IP address lying outside the private network's IP address space, i.e., victim's address) from getting out of the private network. Hence the network cannot be used intentionally or unintentionally as a launching pad (intermediary) of a DDOS attack. The present invention also prevents impersonation in services that use IP address based authentication in a private network.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for preventing an address spoofing based attack from a network, the network having one or more hosts and one or more routers for transporting at least one packet, each router having one or more interfaces, and each interface having a directly connected sub-network, the method comprising:
   receiving a packet into a first interface of a router;
   deriving a first source physical address for the packet based on a source IP address of the packet, a sub-network mask of the first interface, and a memory space of the first interface containing information about the respective IP address of the hosts and one or more other routers and their corresponding physical addresses;
   obtaining a second source physical address directly from an encapsulating frame of the packet;
   determining whether the packet is address spoofed by comparing the first and second source physical addresses, wherein the step of determining further comprises:
      examining whether the source IP address is within a subnet IP address space of a directly connected sub-network of the interface;
      if the source IP address is within the subnet IP address space, determining whether the first source physical address matches the second source physical address;
      if the source IP address is not within the subnet IP address space, checking whether the packet is routed from a neighboring router on the same directly connected sub-network of the interface by checking whether the second source physical address matches with a source physical address present in a neighboring router physical address list of the interface,
      wherein the packet can be determined to be address spoofed when either the second source physical address fails to match the first physical address or the packet is not routed from a neighboring router on the same directly connected sub-network of the interface; and
   discarding the packet if the packet is determined to be address spoofed.

2. The method of claim 1 wherein the step of determining is performed by an anti-spoofing filter implemented on each interface of the router, and wherein the filter is implemented with a first hook to an IP forwarding subsystem in an IP layer of the router, and a second hook to a local delivery subsystem in the IP layer of the router.

3. The method of claim 1 further comprising updating the information about the source IP address and corresponding physical address in the memory space by broadcasting an ARP request on an as-needed basis to the directly connected sub-network of the interface to obtain the physical address corresponding to the source IP address of the received packet.

4. The method of claim 1 further comprising maintaining on the interface an updated list of physical addresses of neighboring routers on the same directly connected sub-network by merging a first list of physical addresses of neighboring routers established by broadcasting one or more ARP requests to obtain the physical addresses of neighbor routers, whose IP addresses are obtained from a routing table, and a second list of neighboring routers established by extracting the source physical addresses from one or more routing advertisement messages.

5. A method for preventing an address spoofing based attack from a network, the network having one or more routers for transporting at least one packet, each router having one or more interfaces, and each interface having a directly connected sub-network, the method comprising:
   implementing a filter in an interface of a router;
   receiving a packet on the interface;
   determining, by the filter, whether the packet is address spoofed by comparing its source physical address derived directly from the packet with an expected physical address derived from a source IP address of the interface, a sub-network mask of the interface, an ARP cache of the interface and a list of physical addresses of neighboring routers, wherein the step of determining further comprises:
      examining whether the source IP address is within a subnet IP address space of a directly connected sub-network of the interface;
      if the source IP address is within the subnet IP address space, deriving the source physical address from an encapsulating frame of the packet, and matching the derived source physical address with a predetermined physical address corresponding to the source IP address in the ARP cache; and
      if the source IP address is not within the subnet IP address space, checking whether the packet is routed from a neighboring router on the same directly connected sub-network of the interface by checking whether the source physical address derived from the packet matches with a physical address present in the neighbor router physical address list of the interface,
      wherein the packet is determined to be address spoofed when either the packet's source physical address fails to match the predetermined physical address corresponding to the source IP address in the ARP cache or the packet is not routed from a neighboring router on the same directly connected sub-network of the interface; and discarding the packet if the packet is determined to be address spoofed.

6. The method of claim 5 wherein the filter is implemented with a first hook to an IP forwarding subsystem in the IP layer of the router, and a second hook to a local delivery subsystem in the IP layer of the router.

7. The method of claim 5 further comprising updating the ARP cache by broadcasting when needed an ARP request to the directly connected sub-network of the interface to obtain the physical address corresponding to the source IP address of the received packet.

8. The method of claim 5 further comprising maintaining on the interface an updated list of physical addresses of neighboring routers on the same directly connected sub-network by merging a first list of physical addresses of neighboring routers established by broadcasting one or more ARP requests to obtain the physical addresses of neighbor routers, whose IP addresses are obtained from the routing table, and a second list of neighboring routers established by extracting the source physical addresses from one or more routing advertisement messages.

9. The method of claim 8 further comprising:
obtaining the IP addresses of the other routers from a routing table of the router;
broadcasting at least one ARP request for corresponding physical addresses of the obtained IP addresses; and
generating the first list of neighboring routers by extracting the physical addresses from a received ARP response to the broadcast request.

10. The method of claim 8 further comprising verifying an authenticity of the routers in the list of neighboring routers after the list is generated.

11. The method of claim 10 wherein the step of verifying includes having a testing router send a special IP packet through a first interface to a tested router and checking whether the special IP packet will be routed back to another interface of the testing router.

12. The method of claim 10 wherein the step of verifying includes forcing a tested router to generate an ICMP redirect message.

13. The method of claim 10 wherein the step of verifying includes making a tested router to generate an ICMP Time Exceed message based on a predetermined time parameter.

14. A system for preventing an address spoofing based attack from a network, the network having one or more routers for transporting at least one packet, each router having one or more interfaces, and each interface having a directly connected sub-network, the system comprising:
a filter in an interface of a router;
means for receiving a packet on the interface;
means for deriving a first source physical address for the packet based on a source IP address of the packet, a sub-network mask of the interface, and a memory space of the interface;
means for obtaining a second source physical address directly from an encapsulating frame of the packet;
means for determining whether the packet is address spoofed by comparing the first and second source physical addresses, wherein the means for determining further comprises:
means for examining whether the source IP address is within a subnet IP address space of a directly connected sub-network of the interface;
means for deriving the source physical address from an encapsulating frame of the packet,
means for matching the derived source physical address with a predetermined physical address corresponding to the source IP address in the ARP cache;
means for checking whether the packet is routed from a neighboring router on the same directly connected sub-network of the interface,
wherein the packet is determined to be address spoofed when either the packet's source physical address fails to match the predetermined physical address corresponding to the source IP address in the ARP cache or the packet is not routed from a neighboring router on the same directly connected sub-network of the interface; and
means for discarding the packet if it is determined to be address spoofed.

15. The system of claim 14 wherein the filter is implemented with a first hook to an IP forwarding subsystem in the IP layer of the router, and a second hook to a local delivery subsystem in the IP layer of the router.

16. The system of claim 14 further comprising means for updating the ARP cache by broadcasting when needed an ARP request to the directly connected sub-network of the interface to obtain the physical address corresponding to the source IP address of the packet.

17. The system of claim 14 further comprising means for updating a list of physical addresses of neighboring routers on the same directly connected sub-network by merging a first list of physical addresses of neighboring routers established by broadcasting one or more ARP requests to obtain the physical addresses of neighbor routers, whose IP addresses are obtained from the routing table, and a second list of neighboring routers established by extracting the source physical addresses from one or more routing advertisement messages.

18. The system of claim 17 further comprising means for verifying an authenticity of the routers in the updated list after the list is generated.

19. A computer-readable medium having instructions stored thereon that when executed on a computer prevent an address spoofing based attack from a network, the network having one or more routers for transporting at least one packet, each router having one or more interfaces, and each interface having a directly connected sub-network, the computer-readable medium comprising instructions for:
receiving a packet at an interface of a router;
deriving a first source physical address for the packet based on a source IP address of the packet, a sub-network mask of the interface, and a memory space of the interface containing information about the IP addresses of the hosts and one or more other routers and their corresponding physical addresses;
obtaining a second source physical address directly from an encapsulating frame of the packet;
determining whether the packet is address spoofed by comparing the first and second source physical addresses, wherein the instructions for determining further comprise instructions for:
examining whether the source IP address is within a subnet IP address space of a directly connected sub-network of the interface;
if the source IP address is within the subnet IP address space, determining whether the first source physical address matches the second source physical address; and
if the source IP address is not within the subnet IP address space, checking whether the packet is routed from a neighboring router on the same directly connected sub-network of the interface by checking whether the second source physical address matches with a source physical address present in a neighboring router physical address list of the interface, wherein the packet can be determined to be address spoofed when either the second source physical address fails to match the first physical address or the packet is not routed from a neighboring router on the same directly connected sub-network of the interface; and discarding the packet if it is determined to be address spoofed.

20. The computer-readable medium of claim 19 wherein the instructions for determining is performed by an anti-spoofing filter implemented on each interface of the router, and wherein the filter is implemented with a first hook to an IP forwarding subsystem in an IP layer of the router, and a second hook to a local delivery subsystem in the IP layer of the router.

21. The computer-readable medium of claim 19 further comprising instructions for updating the information about the source IP address and corresponding physical address in the memory space by broadcasting an ARP request on an as-needed basis to the directly connected sub-network of the interface to obtain the physical address corresponding to the source IP address of the received packet.

22. The computer-readable medium of claim 19 further comprising instructions for maintaining on the interface an updated list of physical addresses of neighboring routers on the same directly connected sub-network by merging a first list of physical addresses of neighboring routers established by broadcasting one or more ARP requests to obtain the physical addresses of neighbor routers, whose IP addresses are obtained from a routing table, and a second list of neighboring routers established by extracting the source physical addresses from one or more routing advertisement messages.

23. A method of operating a network having a router, the method comprising:

receiving a packet at an interface of the router;

comparing source IP and physical addresses of the received packet with expected source IP and physical addresses of the packet, wherein the expected source physical address is based on a source IP address of the packet and a sub-network mask of the interface, wherein the expected source IP and physical addresses are obtainable from the interface, wherein the step of comparing further comprises examining whether the source IP address of the received packet is within a subnet IP address space of a directly connected sub-network of the interface;

if the source IP address of the received packet is within the subnet IP address space, determining whether the source physical address of the received packet matches the expected source physical address; and if the source IP address of the received packet is not within the subnet IP address space, checking whether the packet is routed from a neighboring router on the same directly connected sub-network of the interface by checking whether the expected source physical address matches with a source physical address present in a neighboring router physical address list of the interface, wherein the packet can be determined to be address spoofed when either the expected source physical address fails to match the physical address of the received packet or the packet is not routed from a neighboring router on the same directly connected sub-network of the interface; and discarding the packet if the packet is determined to be address spoofed.

* * * * *